Jan. 28, 1969   J. A. KLINE   3,423,978
MAGNETIC FORMING APPARATUS
Filed April 4, 1967
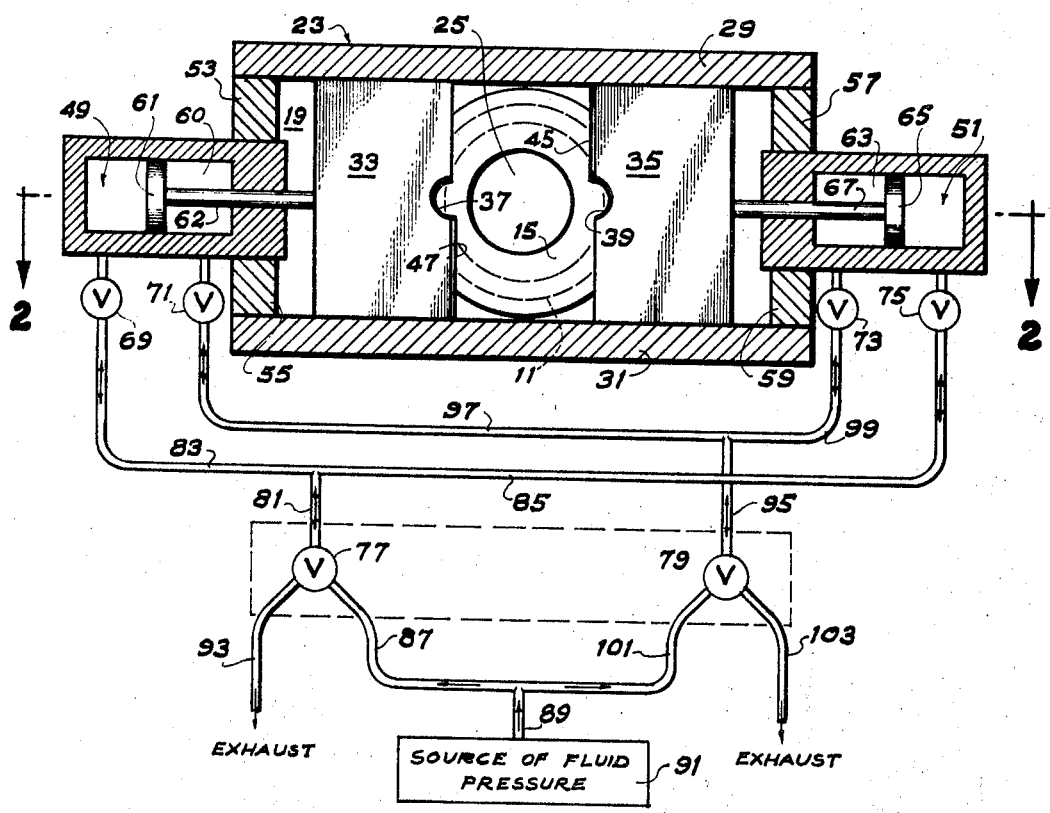
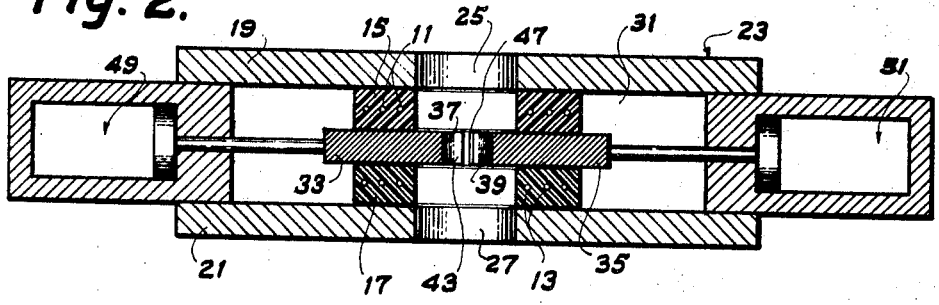
INVENTOR.
JAMES A. KLINE
BY
Anderson, Luedeka, Fitch, Even, & Tabin
ATTORNEYS United States Patent Office 3,423,978
Patented Jan. 28, 1969

1

3,423,978
MAGNETIC FORMING APPARATUS
James A. Kline, San Diego, Calif., assignor, by mesne assignments, to Gulf General Atomic Incorporated, San Diego, Calif., a corporation of Delaware
Filed Apr. 4, 1967, Ser. No. 628,485
U.S. Cl. 72—56                6 Claims
Int. Cl. B21d 26/14

ABSTRACT OF THE DISCLOSURE

A magnetic forming apparatus having an electromagnetic forming coil assembly which incorporates separable field shaping members which are moved relative to each other by fluid operated actuators. The actuators are operable to hold the shaping members in adjacent position when the coil is energized and for limiting movement of the members when the coil is de-energized.

The present invention relates to magnetic forming apparatus and, more particularly, to apparatus for positioning field shapers incorporated in an electromagnetic forming coil assembly.

Magnetic forming apparatus forms materials by employing transient magnetic fields of high intensity. In such apparatus the transient magnetic field is produced by passing an electrical current pulse of high amperage through a conductor. A conductive work piece positioned in the transient magnetic field has a current induced in it, which current interacts with the magnetic field to produce a force acting on the work piece. If the force is sufficiently strong, it produces a deformation of the work piece. The configuration of the deformation is dependent upon the shape of the magnetic field and the position of the work piece relative to the field. Repeated pulses of current may be applied to the conductor, thus causing a series of deforming impulses to be applied to the work piece.

Ordinarily in such magnetic forming apparatus reduction of the cross section of a work piece such as a ring, cylinder, or tube is accomplished by disposing an insulated coil, connected to a source of current pulses, concentrically about the work piece. Current pulses through the coil produce a force on the work piece directed radially inward from the coil.

In some applications it is desired to obtain greater force to form the work piece than is provided by the above-described coil. In other applications, it is desired to concentrate the deforming force at points spaced longitudinally along or circumferentially around the work piece. These results may be achieved by employing a field shaping member or members which define at least one aperture of smaller diameter than the coil. The work piece is inserted in the aperture and is spaced from the inner surface of the field shaping member or members at the aperture. The transient magnetic field produced by the coil induces a current on the surface of the field shaping member around the aperture to thereby create a transient magnetic field in the aperture which is more intense than that produced by the coil because of the increased flux density within the aperture due to its smaller size.

The flux density and, therefore, the force on the work piece within the aperture are dependent upon the shape of the inner surface of the field shaping member and

2 upon the location of the inner surface relative to the work piece. The flux density may be increased in certain areas by providing inwardly extending projections on the inner surface of the field shaper in the vicinity of such areas. For example, an elongated tube can be constricted intermediate its ends through the use of a field shaper which includes a flange projecting inwardly from its inner surface to define a narrow throat.

In certain applications, a work piece is not of uniform cross section but has portions on both sides of the portion to be formed which have larger cross sections than the portion to be formed. This is true, for example, where the work piece has flanged or flared ends. To facilitate insertion of such a work piece into the aperture in the field shaper, the field shaper is made of two mating members, each of which defines part of the aperture and which are separable at the aperture. A strip of insulation is generally placed between the field shaping members to avoid contact therebetween when they are positioned adjacent each other. This insures that the field shaper does not constitute a shorted turn, and that sparking does not occur between the members. Normally in production applications, the field shaper members are reciprocated relative to each other by actuating means.

When the coil is energized, the forces produced by the magnetic field tend to push apart the separable field shaping members. In order to effect the desired forming of the work piece, it is important to prevent the field shaping members from separating during the time increment of the electrical discharge. Because of the very short impulse time, inertial resistance due to the mass of the shaping members in combination with minor restraint from the actuating means prevents significant motion of the halves until forming is complete. After the end of the pulse, however, acceleration is high, resulting in significant outward velocity and shaping members displacement. This after the fact displacement is not detrimental to forming.

The displacements of the field shaping members take place against the separation restraining force provided by the actuating means. Following the dissipation of the outward momentum of the shaping members, the separation restraining force causes the members to be suddenly propelled against each other, resulting in damage to the insulating strip between the field shaping members. Repetitive occurrences of such damage eventually render the insulation ineffective, necessitating shut down for replacement.

In order to prevent the force utilized for restraining the field shaping members against separation from propelling the members against each other when the coil becomes deenergized, the restraining force may be removed simultaneously with the deenergization of the coil. Such simultaneous removal is, as a practical matter, difficult to achieve since it must synchronize with termination of an impulse in the micro-second range. Accordingly, force removal timing must be extremely fast and precise. This is difficult where a pneumatic or similar fluid pressure device is utilized as the actuating means because the release of the fluid pressure takes a relatively long period of time.

It is an object of this invention to provide an improved apparatus for positioning separable field shapers in an electromagnetic forming coil assembly.

Still another object of the invention is to provide a magnetic forming coil assembly incorporating fluid actuated separable field shaping members and having means for preventing damage to insulation between such members.

Other objects of the invention will become apparent to those skilled in the art from the following description taken in connection with the accompanying drawing wherein:

FIGURE 1 is a schematic view of a magnetic forming coil assembly and field shaper actuating apparatus constructed in accordance with the invention, showing the magnetic forming coil assembly partially in section and having its separable field shaping members in a separated relationship; and FIGURE 2 is a sectional view taken along the line 2—2 of FIGURE 1 and showing the separable field shaping members in an adjacent relationship.

Very generally, the magnetic forming apparatus of the invention includes electromagnetic coil means 11 and 13, and a pair of separable field shaping members 33 and 35 in inductive relation to the coil means. Insulating material 45 and 47 is positioned between the members for preventing contact therebetween. The members, when positioned adjacent each other, define an aperture 43 for producing a forming field in response to energization of the coil means. Fluid actuating means 49 and 51 are provided for effecting relative movement between the separable field shaping members to facilitate the positioning of a work piece in the aperture, and for holding the members adjacent each other when the coil means is energized. In order to prevent damaging forces from being exerted on the insulating material when the coil means becomes de-energized, provision is made for limiting movement of the separable field shaping members toward each other when the coil means becomes de-energized.

In the embodiment illustrated in the drawings, the magnetic forming apparatus includes an electromagnetic coil means in the form of two electromagnetic coils 11 and 13 which are of spiral configuration and are embedded, respectively, in two annular insulating slabs 15 and 17. The coils are connected in series to a source of electrical current pulses, not illustrated, and act in response to pulses applied thereto to produce a high energy transient magnetic field.

The annular slabs 15 and 17 are suitably attached, by means not shown, to the inner facing surfaces of a pair of spaced apart, rectangular side walls 19 and 21 of a supporting frame 23. The walls 19 and 21 are provided with mutually aligned openings 25 and 27, respectively, which are aligned with the internal spaces defined by the annular slabs 15 and 17. The diameter of the openings 25 and 27 and the inner diameter of the slabs 15 and 17 are made sufficiently large to permit a particular work piece (not shown) with which the apparatus is to be used to be positioned in the desired maner for forming. The walls 19 and 21 are connected together by a top plate 29 and a base plate 31. The strength of the frame structure comprised of the side walls 19 and 21 and the plates 29 and 31 is such as to restrain the slabs 15 and 17 against axial movement away from each other. Forces which have a tendency to produce such axial movement are generated upon energization of the coils 11 and 13. The frame structure 23 may be suitably supported by means, not shown.

The slabs 15 and 17 are spaced axially from each other and accommodate two separable field shaping members 33 and 35. The field shaping members 33 and 35 comprise a pair of generally rectangular conductive plates. Each plate has a semicircular notch 37 and 39, respectively, formed in the edge closest to the other plate. The shaping members 33 and 35 are capable of sliding toward each other and away from each other, guided by a proportioned spacing of coil support slabs 15 and 17. When the shaping members are positioned adjacent each other, the semicircular notches 37 and 39 are located so that the plates define an aperture 43 (see FIGURE 2). The aperture 43 is axially aligned with the openings 25 and 27 and with the annular slabs 15 and 17 and the coils 11 and 13 therein.

With the shaping members 33 and 35 positioned adjacent each other as shown in FIGURE 2, the transient magnetic field produced by pulse energization of the coils 11 and 13 induces a current in the shaping member, which flows around the surfaces of the members adjacent the aperture 43. In order to prevent sparking and the aperture from constituting a closed loop or shorted turn, the shaping members 33 and 35 are separated from each other by strips of insulation 45 and 47. The strip 45 is positioned upon the inner edge of the shaping member 35 above the notch 39, and the strip 47 is positioned on the inner edge of the shaping member 33 below the notch 37. Such placement, however, is not necessarily critical to the invention, as any suitable configuration or spacing for the insulation, in order to insulate the shaping members from each other, is satisfactory. As previously mentioned, current flow around the aperture reduces a current flow in the conductive work piece to be formed thereby resulting in deforming forces exerted on the work piece.

As illustrated, a pair of actuating means 49 and 51 are provided for effecting relative movement between the slidable field shaping members 33 and 35 to facilitate positioning a work piece in the aperture 43. Thus, although the diameter of the aperture 43 is much smaller than the diameter of the openings 25 and 27, and the inner diameter of the slabs 15 and 17, the ability to separate the shaping plates means that a work piece having portions on either side of the portion to be formed of larger diameter than the aperture may still be properly positioned in the apparatus by separating the shaping plates 33 and 35.

The illustrated actuating means comprise two fluid pressure devices 49 and 51. The device 49 is mounted between two cross members 53 and 55 which extend between the side plates 19 and 21, respectively. Similarly, the device 51 is mounted between two cross members 57 and 59 suitably secured to the opposite ends of the side plates 19 and 21, respectively, from the brackets 53 and 55. The fluid pressure device 49 consists of a cylinder 60 and a piston 61 which is movable therein. The piston 61 is attached by a piston rod 62 to the shaping member 33 and thus the shaping member is moved with the piston. Similarly, the fluid pressure device 51 consists of a cylinder 63 and a piston 65 movable therein. The piston 65 is attached to the shaping member 35 by a piston rod 67 and, accordingly, the shaping member 35 is movable with the piston 65. The piston rods 62 and 67 are sized so that the pistons 61 and 65 bottom in their associated cylinders 60 and 63 when the shaping members 33 and 35 are in their operating posiitons.

Although two fluid pressure devices are utilized in the illustrated embodiment, it is to be understood that one of the shaping members 33 or 35 may be fixed with respect to the coils 11 and 13 and only one plate made movable with respect thereto. In such a case, somewhat greater difficulty may be presented to the insertion of the work piece within the aperture, however, only a single fluid pressure device is required.

An arrangement of valves and pipes is utilized for operating the fluid pressure devices 49 and 51. The arrangement includes four flow control valves 69, 71, 73 and 75, each of which is designed to permit a relatively full flow in one direction and to restrict flow in the opposite direction to a fraction of the full flow. Preferably, the reverse flow through the flow control valves 69, 71, 73 and 75 is restricted by an adjustable needle and orifice arrangement which may be placed at a desired setting. For example, the restricted flow may be of the order of $\frac{1}{10}$ the full flow. The flow control valves 69 and 71 are connected to the cylinder 60 on opposite sides of the piston 61, and are oriented to discharge their full flow into the cylinder 60 and to restrict flow out of the cylinder. The flow control valves 73 and 75 are connected to the cylinder 63 on opposite sides of the piston 65 and are oriented to discharge their full flow into the cylinder 63 and to restrict flow out of the cylinder.

Two three-way valves 77 and 79 are provided. The three-way valves may be of any suitable type, but are preferably solenoid operated. The three-way valve 77 is connected through a line 81 and a line 83 to the flow control valve 69. Similarly, the three-way valve 77 is connected through the line 81 and a line 85 to the flow control valve 75. The three-way valve 77 operates to connect the line 81 through a line 87 and a line 89 to a source of fluid pressure 91, or to connect the line 91 to an exhaust line 93. Thus, flow in the line 81 may be in either direction according to the operation of the three-way valve 77. In this manner, fluid is added to or removed from the cylinders on the sides of the pistons opposite the piston rods. Outflow from the cylinders is restricted by the flow control valves 69 and 75.

The three-way valve 79 is connected through a line 95 and line 97 to the flow control valve 71. Similarly, the three-way valve 79 is connected through the line 95 and a line 99 to the flow control valve 73. The three-way valve 79 is the same type of valve as the valve 77 and operates to alternately connect the line 95 through a line 101 and the line 89 to the source of fluid pressure 91, or to connect the line 95 to an exhaust line 103. Thus, flow in the line 95 may be in either direction according to the operation of the three-way valve 79. In this manner, fluid is added to or removed from the cylinders on the rod sides of the pistons. Outflow from the cylinders is restricted by the flow control valves 71 and 73.

At the start of forming operations, and with the shaping members 33 and 35 positioned adjacent each other as illustrated in FIGURE 2, the shaping members are moved away from each other to facilitate insertion of a work piece in the aperture 43. Relative movement of the plates away from each other is accomplished by positioning the three-way valve 77 such that the line 81 is attached to the exhaust line 93 and by positioning the three-way valve 79 so that the line 95 is coupled to the source of fluid pressure 91. Fluid pressure then enters the cylinders 60 and 63 on the rod sides of the pistons 61 and 65. This urges the pistons outwardly away from each other and effects a corresponding movement of the shaping plates 33 and 35.

Once the work piece is placed in the desired position, the shaping plates are closed by switching the three-way valve 79 to connect line 95 to the exhaust line 103 and by switching the three-way valve 77 to connect line 81 to the source of fluid pressure 91. This moves the pistons toward each other and brings the shaping plates 33 and 35 into an adjacent relationship. The pressure source is kept connected through the three-way valve 77 and the flow control valves 69 and 75 during the forming operation in order to hold the shaping plates in position against the magnetic forces which tend to drive them apart.

Notwithstanding this holding pressure, however, some displacement of the pistons 61 and 65 occurs when the coils are energized. The displacement causes a pressure drop, and sometimes a vacuum, on the rod sides of the pistons and a pressure increase due to compression of the fluid on the opposite sides of the pistons. Upon de-energization of the coils 11 and 13, the resulting pressure difference forces the pistons 59 and 65 rapidly toward each other, causing the shaping plates 33 and 35 to be rapidly moved toward each other. When the shaping plates and insulation strips 45 and 47 strike, damage to the insulation strips results. In repeated forming operations, such repeated damage eventually necessitates replacement of the insulation and a corresponding shut down time.

In the illustrated embodiment, the movement of the shaping plates toward each other upon coil deenergization is limited by applying a pressure to the rod sides of the pistons. This is done before the coils are energized by operating the three-way valve 79 to connect the fluid pressure to the cylinders 60 and 63.

Upon energization of the coils the shaping members 33 and 35, and hence the pistons, move outward thereby permitting fluid to enter the rod sides of the pistons. Upon de-energization of the coils 11 and 13, followed by dissipation of the outward momentum of the shaping members, the tendency for movement of the pistons toward each other is resisted by the compression of fluid in the cylinders on the rod sides of the pistons. The fluid in this region of the cylinders 60 and 63 is not quickly expelled because of the limited reverse flow of the flow control valves 71 and 73. The flow control valves 71 and 73 are adjusted so that the reverse flow permitted thereby is small enough that the compression of the fluid prevents the shaping plates and insulation from striking each other. Since there is a minimum piston clearance volume at the rod end, the compression ratio is large when motion progresses toward reclosure of the shapers.

Various other embodiments of the invention, in addition to those shown and described herein, will become apparent to those skilled in the art from the foregoing description and accompanying drawings. Such other embodiments, and modifications thereof, are intended to fall within the scope of the appended claims.

What is claimed is:

1. A magnetic forming apparatus including in combination, electromagnetic coil means, a pair of separable field shaping members disposed adjacent said coil means, insulating means positioned between said members for preventing contact therebetween, said members defining an aperture when positioned adjacent each other for producing a forming field in response to energization of said coil means, and means for effecting relative movement between said members to facilitate the positioning of a work piece in said aperture and for holding said members in adjacent position when said coil means are energized, said movement effecting means including means for limiting movement of said members toward each other when said coil means becomes de-energized, thereby preventing damaging force from being exerted on said insulating means.

2. Apparatus in accordance with claim 1 wherein said movement effecting means comprise at least one cylinder having a piston therein secured to one of said members, means for establishing a first fluid pressure on one side of said piston exerted in a direction opposing relative movement of said members toward each other, and means for establishing a second fluid pressure on the other side of said piston for positioning and holding said members adjacent each other.

3. A magnetic forming apparatus in accordance with claim 2, in which said first pressure applying means is operable after said members are positioned adjacent each other and applies pressure sufficient to prevent damaging force from being exerted on said insulating means when said coil means becomes de-energized.

4. A magnetic forming apparatus in accordance with claim 1 wherein said movement effecting means comprise a pair of cylinders, each having a piston therein secured to a respective one of said members, means for applying a first fluid pressure to one side of each of said pistons for positioning and holding said members adjacent each other, means for applying a second pressure to the side of each of said pistons opposite said one side, said second pressure being applied after said members are positioned adjacent each other, and being sufficient to prevent damaging force from being exerted on said insulating means when said coil means become de-energized.

5. Apparatus in accordance with claim 4 wherein said first pressure applying means comprise a first valve for coupling a source of fluid pressure to said one side of each of said pistons, and wherein said second pressure applying means comprise a second valve for coupling the same source to said opposite side of each of said pistons.

6. Apparatus in accordance with claim 5 wherein valve means are interposed between said second valve and said opposite sides of said pistons for limiting flow of fluid from the cylinders to an amount which is small enough to prevent damaging force from being exerted on said insulating means when said coil means are de-energiezd.

References Cited

UNITED STATES PATENTS 3,252,313  5/1966  Eilers et al. _____ 72—56

3,347,074  10/1967  Eilers et al. _____ 72—56

RICHARD J. HERBST, *Primary Examiner.*

U.S. Cl. X.R.

72—453